R. T. NEWTON.

AUTOMOBILE BUMPER.

APPLICATION FILED MAR. 8, 1921.

Reissued Nov. 29, 1921.

15,238.

2 SHEETS—SHEET 1.

INVENTOR

RICHARD T. NEWTON

BY

Strauss and Strauss

ATTORNEYS

R. T. NEWTON.
AUTOMOBILE BUMPER.
APPLICATION FILED MAR. 8, 1921.
Reissued Nov. 29, 1921. 15,238.
2 SHEETS—SHEET 2.
*Fig. 3.*
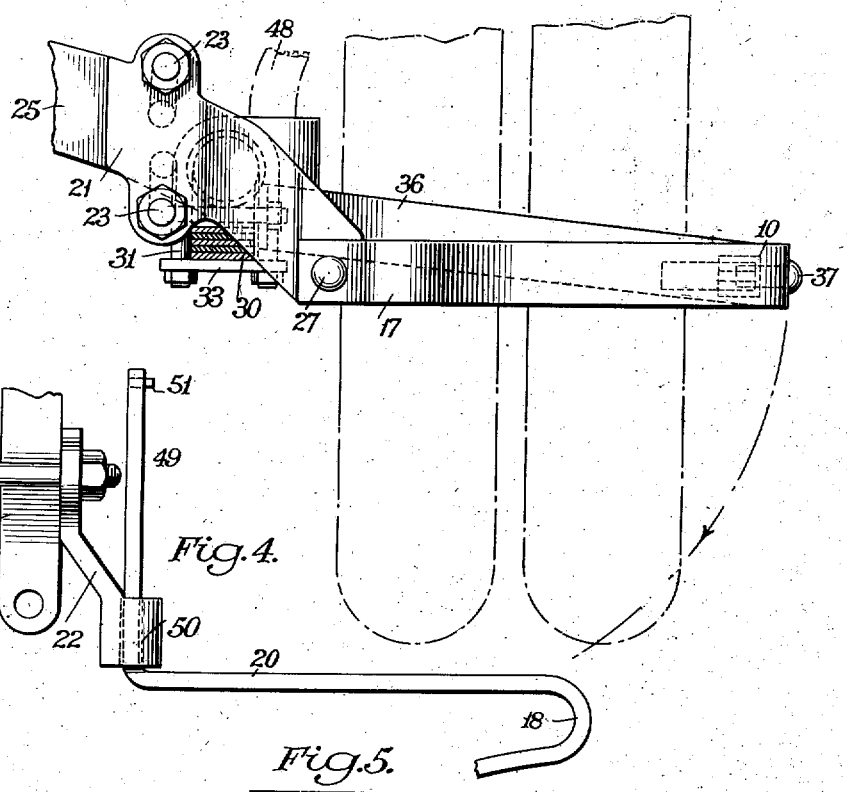
*Fig. 4.*
*Fig. 5.*
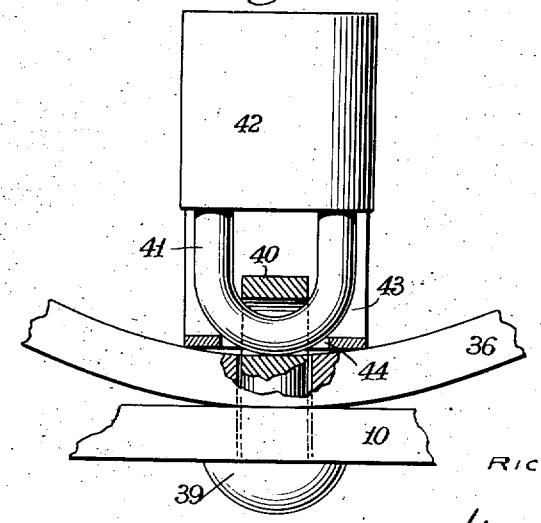
*Fig. 6.*
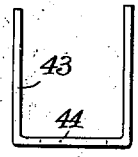
INVENTOR
RICHARD T. NEWTON
BY
Strauss and Strauss
ATTORNEYS

UNITED STATES PATENT OFFICE.

RICHARD T. NEWTON, OF NEW YORK, N. Y.

AUTOMOBILE-BUMPER.

15,238. Specification of Reissued Letters Patent. Reissued Nov. 29, 1921.

Original No. 1,325,368, dated December 16, 1919, Serial No. 297,287, filed May 15, 1919. Application for reissue filed March 8, 1921. Serial No. 450,603.

*To all whom it may concern:*

Be it known that I, RICHARD T. NEWTON, a citizen of the United States of America, and residing in the city, county, and State of New York, have invented certain new and useful Improvements in Automobile-Bumpers, of which the following is a specification.

My invention relates to automobile bumpers, and particularly to bumpers for the rear of the car, the special object of my invention being to provide a combined bumper and spare tire lock which not only protects the rear of the car and the tire against injury, but also locks the spare tires or rims against theft or accidental loss.

In the accompanying drawings—

Figure 1:
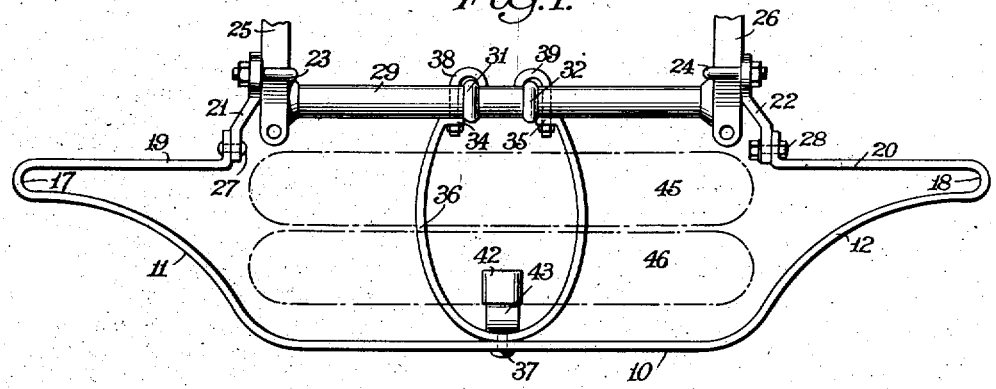
Figure 2:
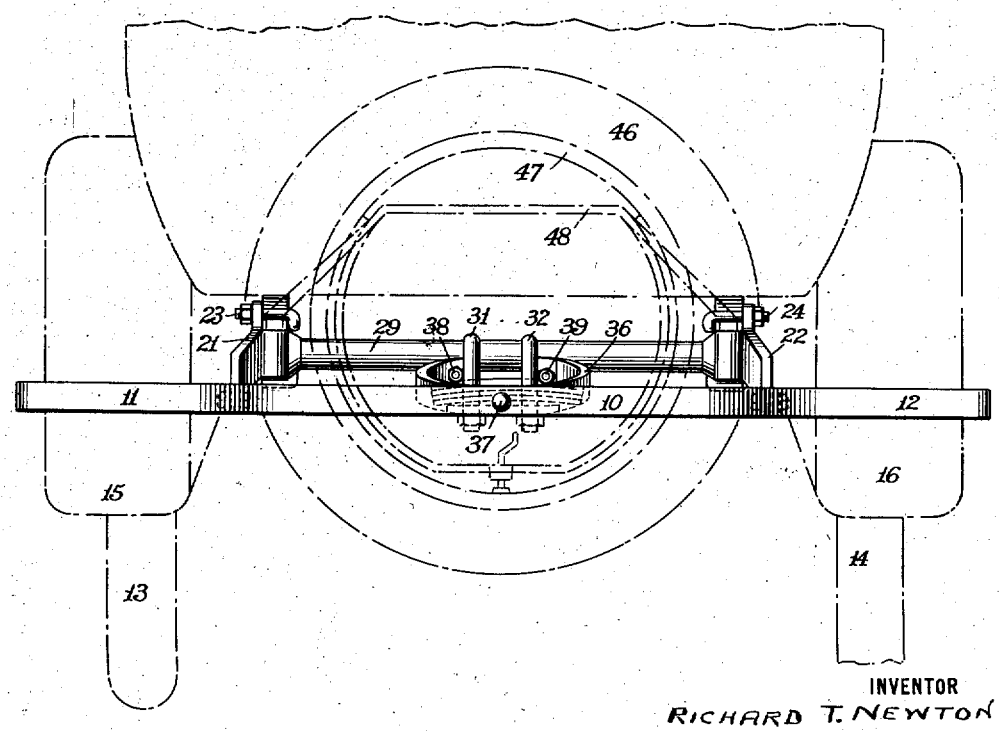

Figure 1— is a plan view of a bumper embodying my invention in one form;

Fig. 2— is a rear elevation thereof;

Fig. 3— is an enlarged side elevation;

Fig. 4— is a partial plan of a modified construction;

Fig. 5— is an enlarged broken plan view of the bumper lock; and

Fig. 6— is a plan of the lock sheath.

While the bumper may be of any desired type, I have here shown its elements made from flat spring steel and comprising an impact member 10 arranged in substantially horizontal position and stretching across the rear of the car with its ends 11 and 12 curved inwardly toward the car, but laterally extended to project to or slightly beyond the wheels 13 and 14 and their mud guards 15 and 16. Return bends 17 and 18 at the ends of the impact member unite the latter to the supporting arms 19 and 20, which are secured to brackets 21 and 22 mounted by means of hook bolts 23 and 24 to the rear ends 25 and 26 of the chassis side bars. The joint between the supporting arms 19 and 20 and the brackets 21 and 22 is of such nature that the impact member 10 may be swung downward, for the reason hereinafter pointed out. As here shown, the joint is effected by means of a rivet 27 or bolt 28, which constitute the axis on which the bar is pivoted.

Between the chassis side bars 25 and 26 extends a stiffening rod 29, from which the rear spring 30 (Fig. 3) is hung by means of a pair of stirrups 31 and 32, and a cross plate 33 underlying the spring. Abutting against the edge of the leaves which constitute this spring are the feet 34 and 35 of the spring arch 36, the bow of which extends outwardly and is secured to the mid area of the impact member 10 by means of a bolt 37. The feet 34 and 35 of this spring arch are pierced by the shanks of hook bolts 38 and 39, the hook ends of which engage the inner legs of the stirrups 31 and 32. The bolt 37, which passes through the impact member 10 and the crown of the spring arch 36, has an eye 40 at its inner end to accommodate the shackle 41 of a padlock 42, of any suitable type. In order to protect the shackle 41 against cutting, I provide a casing element 43 centrally apertured at 44 to pass over the shank of the bolt 39 and incase the shackle. This sheath 43 may be made of tempered steel or any suitable material which is difficult to cut.

On many cars it is customary to support at the rear of the chassis spare tires 45 and 46. In the present construction I have shown these tires mounted on rims 47 and supported by a bracket 48 of well known type. The construction of the bumper is such that the impact member 10 extends beyond the tires with sufficient clearance to protect them from injury, while the spring arch 36 passes through the circular bracket 48 on which the tires are mounted and thus effectually prevents their surreptitious removal, or their loss should they accidentally fall off the bracket 48. It is obvious that in order to remove a tire from the bracket 48 it is necessary to open the padlock 42, disengage its shackle 41 from the bolt 39, withdraw the bolt and swing the impact member 10 of the bumper down sufficiently to permit the lower portion of the tire to be taken through the space then afforded between the arch 36 and the impact member 10 in its downwardly swung position.

In the modification shown in Fig. 4, (one arm 20 of the bumper being illustrated) each arm 20 is provided with a rearwardly extending bar 49, which passes through a sleeve 50 formed at the end of the bracket 22. At the end of the arm 49 a stop pin 51 is provided to halt it against complete withdrawal. In a bumper of this construction, the impact member 10, instead of being swung down after the bolt 39 is removed in order to permit the withdrawal of the spare tire, is pulled outward a sufficient distance to permit the tire to pass between the supporting arch 36 and the impact member of the bumper. Unless the sleeve 50 is lined with some suitable packing, however, this construction is apt to result in rattle. This disadvantage is eliminated in the construction first described, by making the impact bar 10 of such normal curvature that it is placed under sufficient tension, when pressed inward against the arch 36 and fastened, to maintain the pivot joints 27 and 28, the shackle 41, and casing 43 (Figs. 1–3) all free from rattle.

Obviously other types of auxiliary spring than the arch 36 can be used with equal efficiency, and the shape and curvature of the impact member 10 varied to suit different tastes or conditions without departing from my invention. For example, the pivot support may be employed for the arch 36 instead of for the impact member of the bumper, if preferred; the member 36 may be simply a lock bar without adding to the resilient strength of the bumper; and other variations will readily occur to those skilled in the art. In any event the construction would be such that on impact against the bumper the latter yields sufficiently to cushion the shock, while at the same time the tires are protected against loss or theft. The particular construction shown is readily and economically manufactured, and the securing means are simple and efficient.

I claim:—

1. An automobile bumper comprising an impact member, means for supporting the same upon an element of the automobile, an auxiliary bumper member normally engaging the impact member but readily detachable therefrom, and means for supporting the auxiliary member upon an element of the automobile, said auxiliary and impact members being relatively separable in disengaged condition but while supported on the automobile.

2. An automobile bumper comprising an impact member, an associated member detachably engaging the mid area of the impact members, and means for so supporting one of said members on an automobile element as to permit the separation of said impact and associated members when detached.

3. An automobile bumper comprising a spring impact member, an associated spring member normally engaging the mid area of the impact member to reinforce the same, but readily disengaged therefrom, and means for so supporting one of said bumper members on the automobile as to permit the ready separation of said members when disengaged.

4. An automobile bumper comprising a spring impact member, an associated spring member normally engaging the mid area of the impact member to reinforce the same, lock means for normally holding said members in engagement but permitting them to be readily freed, and means for so supporting one of said bumper members on the automobile as to permit the ready separation of said members when disengaged.

5. An automobile bumper comprising an impact member, means for supporting the same on the side bars of the automobile chassis, and an auxiliary spring arch normally engaging the mid area of the impact member, and means for mounting said spring arch on a cross member passing between the chassis side bars.

6. An automobile bumper comprising an impact member, means for supporting the same on the side bars of the automobile chassis, and an auxiliary spring arch normally engaging the mid area of the impact member, but readily detachable therefrom, and means for so supporting one of said bumper members on the automobile as to permit the ready separation of said members when disengaged.

7. An automobile bumper comprising an impact member, means for supporting the same on the side bars of the automobile chassis, and an auxiliary spring arch normally engaging the mid area of the impact member, but readily detachable therefrom, and means for so supporting one of said bumper members on the automobile as to permit the ready separation of said members when disengaged, the support of one of said bumper members being such that said members may be readily separated when disengaged at the mid area of the impact member.

8. The combination with an automobile having means for supporting spare tires, of a bumper comprising an impact member arranged to protect the tires, and an associated member engaging the impact member and passing through the tires to lock the same against theft.

9. The combination with an automobile having means for supporting spare tires, of a bumper comprising an impact member arranged to protect the tires, and an associated member engaging the impact member and passing through the tires to lock the same against theft, said associated and impact members being separable to permit the removal of a tire.

10. The combination with an automobile having chassis side bars, a stiffening cross bar at the rear end of the chassis and means for supporting spare tires in transverse position at the rear of the car, of a rear bumper comprising an impact member supported at its opposite ends upon the chassis side bars, and a tire locking member engaging the impact member in its mid area and passing through the spare tires into engagement with the cross bar of the chassis to lock the tires against theft.

11. The combination with an automobile having chassis side bars, stiffening cross bar at the rear end of the chassis, and means for supporting spare tires in transverse position at the rear of the car, of a rear bumper comprising an impact member supported at its opposite ends upon the chassis side bars, and a tire locking member engaging the impact member in its mid area and passing through the spare tires into engagement with the cross bar of the chassis to lock the tires against theft, the engagement between the locking member and the impact member being lock-controlled to permit the disengagement of said parts for the removal of a tire.

12. The combination with an automobile having chassis side bars, a stiffening cross bar at the rear end of the chassis and means for supporting spare tires in transverse position at the rear of the car, of a rear bumper comprising an impact member supported at its opposite ends upon the chassis side bars, and a tire locking member engaging the impact member in its mid area and passing through the spare tires into engagement with the cross bar of the chassis to lock the tires against theft, the engagement between the locking member and the impact member being lock-controlled to permit the disengagement of said parts for the removal of a tire, and the support of one of said members on the car being such that it may be moved with relation to the other member to separate the same on the removal of a tire.

13. A bumper for motor vehicles comprising a horizontally disposed member arranged transversely of the vehicle, arms connecting said member to the longitudinal side-sills of the vehicle chassis, the outer portion of said arms curved outwardly away from each other, and a supplementary transverse and horizontal member secured to the vehicle chassis independently of the means for securing said arms and supporting the forward portion of said structure.

14. A bumper for motor vehicles, comprising a horizontally disposed member, the end portions whereof are bent inwardly and rearwardly to provide arms, means for securing the ends of said arms to the vehicle, a supplementary member connected to the before mentioned structure, and means for securing said supplementary member contrally of the vehicle.

15. The combination with the chassis-frame of a vehicle, and springs carried thereby, of a shock-receiving piece having members extended therefrom and secured to the chassis-frame, and means for supporting the last-mentioned structure intermediate the places where said members are secured to the vehicle; said means including the devices that secure said springs to said frame.

16. The combination with the chassis-frame of a vehicle, and springs carried thereby, of a shock-receiving piece having members extended therefrom and secured to the chassis-frame, a supplementary member connected to the last-mentioned structure, and means for securing said supplementary member to the chassis-frame and comprising the elements that secure said springs to said frame.

17. The combination with the chassis-frame of a vehicle, springs, and devices securing said springs to said frame, of a shock-receiving element having lateral members that are secured to said frame, and a supplementary member connected to the last mentioned structure and secured to the frame by said spring-securing devices.

18. In a bumper for motor vehicles, a shock receiving piece, members extended rearwardly therefrom and secured to the vehicle, in combination with a supplementary supporting structure suitably connected to the aforesaid structure and connected to the vehicle body at a point independent of the means for securing said first mentioned structure to the vehicle.

19. In a bumper for motor vehicles, a shock-receiving piece, members extended rearwardly therefrom and secured to the vehicle in combination with a supplementary supporting structure consisting of a horizontally yieldable metal strap suitably connected to the aforesaid structure and connected to the vehicle body at a point independent of the means for securing said first mentioned structure to vehicle.

20. A bumper for motor vehicles comprising a piece of strap-metal bent to provide a shock-receiving piece, arms extended rearwardly from said shock-receiving piece and secure to the vehicle, and secondary piece of strap-metal connected to the first-mentioned piece and supporting the same, and connected directly to the vehicle independent of said arms.

21. A bumper for motor vehicles comprising a shock-receiving piece with arms extended rearwardly from the ends thereof for attachment to the vehicle, and a supplementary member extending and having attachment directly between the shock-receiving piece and a portion of the vehicle between and forward of the points of attachment of the before mentioned arms; said members consisting of strap-metal vertically disposed whereby a cantaliver support is provided for maintaining the bumper in position and against impacts received thereby.

In testimony whereof I have signed my name to this specification.

RICHARD T. NEWTON.